Dec. 3, 1957     L. MATTESON     2,814,902

EXPENDABLE CASTING WEIGHT

Filed Jan. 10, 1955

INVENTOR.
LEIGH MATTESON
BY Lyon & Lyon
ATTORNEYS

United States Patent Office 2,814,902
Patented Dec. 3, 1957

2,814,902

EXPENDABLE CASTING WEIGHT

Leigh Matteson, Santa Barbara, Calif.

Application January 10, 1955, Serial No. 480,690

13 Claims. (Cl. 43—43.12)

My invention relates to expendable casting weights and included in the objects of my invention are:

First, to provide an expendable casting weight which may be firmly attached to a fishing line to facilitate casting the line and which incorporates a soluble link which dissolves or disintegrates in the water to free the line.

Second, to provide an expendable casting weight wherein the soluble link is arranged to provide a preselected time delay between becoming wetted and releasing the weight so that the bait and hook carried by the fishing line is caused to sink a predetermined depth before being released.

Third, to provide an expendable casting weight which may be arranged with a plurality of soluble retaining links having preselected different dissolving times so that the time delay period varies to meet different conditions.

Fourth, to provide an expendable casting weight wherein a single weight may have a plurality of means of attachment to a fishing line to meet various conditions of use or the custom of the user.

Fifth, to provide an expendable casting weight wherein little or no vestige of the weight remains on the fishing line so as to offer no impediment in retrieving the line.

Sixth, to provide an expendable casting weight for fishing lines wherein the connection between the casting weight and the fishing line is rendered readily rupturable after submergence, so that the casting weight may be freed from the line upon a fish striking the bait or upon jerking of the fishing line by the user.

Seventh, to provide an expendable casting weight which is particularly inexpensive of manufacture.

With the above and other objects in view, as may appear hereinafter, reference is directed to the accompanying drawings in which.

Figure 1:
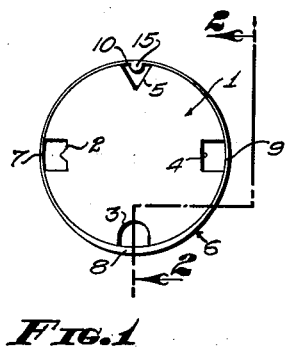
Figure 1 is a side view showing one form of my expendable casting member.
Figure 2:
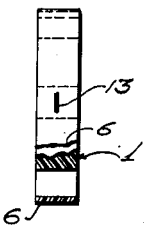
Fig. 2 is a partial sectional, partial edge view thereof, taken through 2—2 of Fig. 1.

Reference is first directed to Figs. 1 through 5. The expendable casting weight herein illustrated comprises a body member 1, preferably formed of extruded plastic material which has been impregnated with a weighting substance, for example, barium sulphate. Any other material having substantial density may be employed that is capable of being mixed with plastic material and extruded therewith.

The body member 1 is formed from the extruded bar of the material by cutting the bar transversely to form a disc. The disc is preferably circular in form and provided with one or more axially directed notches in its periphery. It is preferred to provide several such notches, designated 2, 3, 4, and 5. These notches preferably have different configurations so that they can be identified by touch.

The disc is enveloped by a band 6 of water soluble plastic material. One such plastic material which has been found satisfactory is plasticized polyvinyl alcohol. The band may be initially a sleeve extruded over the rod from which the body member 1 is formed. The portion of the band which overlies the various notches forms soluble membranes 7, 8, 9, and 10.

In order to adapt the disposable casting weight to various modes of attachment to the fishing line and to meet various conditions of use, the soluble membranes may differ in thickness or be especially arranged to receive specific devices. For example, the membrane 7 overlying the notch 2 may be of uniform thickness and designed to dissolve in water at 34° F. in ten seconds. The film may thus have a thickness of .005, .010, or other thickness, depending upon the solubility rate of the particular plastic material used. In the drawings the thickness of the water soluble membrane is greatly exaggerated.

Figure 4:
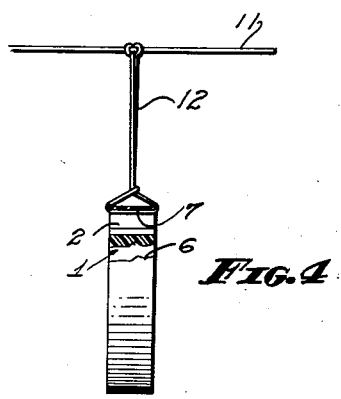
Fig. 4 is a partial sectional, partial edge view showing the manner of attachment to a fishing line by means of a loop member.

The casting weight is attached by the membrane 7, either by looping a portion of the fishing line 11 itself around the membrane or by use of a dropping loop 12, as shown in Fig. 4. The dropping loop in turn is suitably fastened to the fishing line.

The soluble membrane 8 covering the notch 3 of the body member 1 may be thicker than the membrane 7 to provide a longer time delay before the weight detaches from the fishing line.

Figure 5:
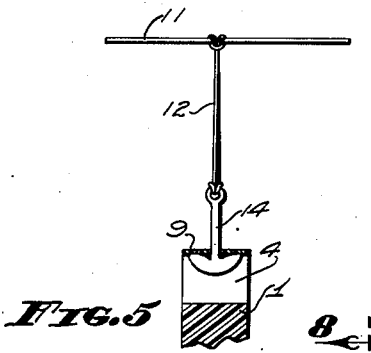
Fig. 5 is a fragmentary sectional view showing the mode of attachment to a fishing line, using a special T-anchor.

Further, the membrane 9 covering the notch 4 may be provided with a slit 13 adapted to receive a T-anchor 14, as shown in Fig. 5, the T-anchor being formed of plastic material and arranged so that the cross portion of the T may be inserted through the slit 13, whereupon the T-anchor is turned at right angles. The T-anchor is attached by a dropping loop 12, or other means, to the fishing line 11.

Figure 3:
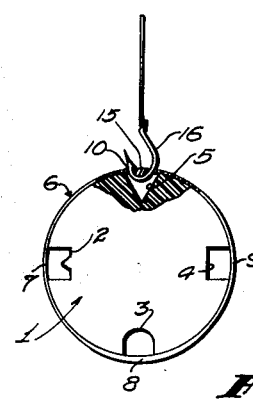
Fig. 3 is a side view thereof with a portion in section, showing the manner of attaching the casting weight to a fish hook.

Still further, the membrane 10 covering the notch 5 may be provided with an axially directed rib 15 so that a fish hook 16, which may be part of a lure or a fishing fly, may be inserted through the membrane and around the rib, as shown in Fig. 3.

Irrespective of the mode of attachment, the casting weight is fastened to the fishing line in such a manner as to withstand the forces exerted when the fishing line is cast. The soluble membrane begins to dissolve as soon as the casting weight is submerged in the water, and after a time delay, determined by the specific water soluble plastic used and the thickness of the attaching membrane, the membrane dissolves and frees the fishing line from the casting weight.

Figures 6, 8:
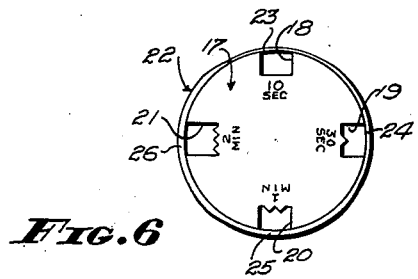
Fig. 6 is a side view of a modified form of my expendable casting weight.
Fig. 8 is a sectional view thereof, taken through 8—8 of Fig. 7.

Reference is now directed to Fig. 6. In this construction a body member 17 is provided, similar to the body member 1, and provided with a plurality of notches 18, 19, 20, and 21 of different profiles so that they can be identified by touch. As in the first described structure, the periphery of the body member 17 is covered by a band 22. In this case, in place of only two choices of time delay, four choices are provided by soluble links 23, 24, 25, and 26 of varying thickness. Imprinted on the body member may be time indications, such as ten seconds, thirty seconds, one minute, two minutes, indicating the nominal dissolving time of the corresponding soluble links.

Figure 7:
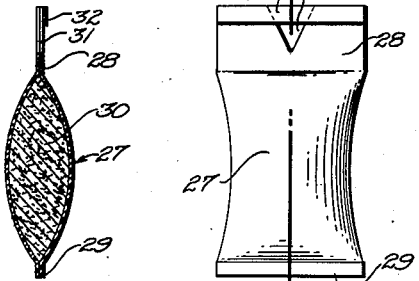
Fig. 7 is an elevational view of a further modified form of my casting weight.

Reference is now directed to Figs. 7 and 8. In this construction a bag 27 is formed. This may be constructed from an extruded tube of plastic material, which may or may not be water soluble. The ends of the bag are sealed, as indicated by 28 and 29. First, however, the bag is filled with a weighting material 30, such as barium sulphate or other material having the requisite density. The sealed end 28 is of sufficient width to accommodate a notch 31, the outer edge margin of which is bridged by a strip of soluble material 32, such as polyvinyl alcohol. There is thus provided an eyelet, as in the first described structure, through which a hook or other attaching means may be inserted so as to fasten the bag on a fishing line. The arrangement shown in Figs. 7 and 8 is employed in the same manner as the first described structure. Once the casting weight formed by the bag and its contents submerges in water, the soluble strip 32, after a predetermined time delay, releases the fishing line from the casting weight.

Figure 9:
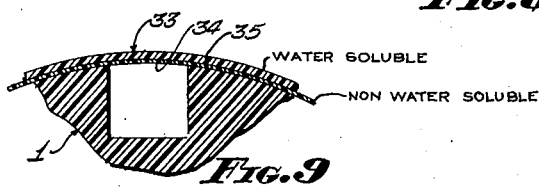
Fig. 9 is a fragmentary sectional view of a further modified form of my expendable fishing weight.

Reference is now directed to Fig. 9. In the previously described structures water soluble membranes are disclosed so that the casting weight is automatically freed from the line. There are occasions, however, when it is desired to retain the casting weight on the line until such time as a fish strikes the bait or the line is being retrieved. This may be accomplished by providing a laminated membrane 33 comprising a non-water soluble lamination 34 and a water soluble lamination 35.

A tear strength for the non-water soluble lamination is selected which is insufficient to withstand the forces involved in casting, but the combined strength of both laminations is amply sufficient for casting purposes. Thus the fishing line may be cast, then, after a preselected period of time, the water soluble lamination dissolves, leaving the weight attached to the line only by the fragile non-water soluble lamination. This is sufficient to retain the weight on the fishing line against the ordinary turbulence of the water, but is insufficient to withstand the forces imposed should the line be given a sudden jerk by the fisherman or should a fish strike the bait.

Thus in the course of bringing in a fish the weight detaches itself from the line so as not to impede the operation. Also, in the course of retrieving the line over rocks or through seaweed the weak non-water soluble lamination gives way so that the line is freed of the weight.

It will be observed that the laminated membrane may be adapted to any of the constructions shown. Also, it will be observed that the size and mass of the casting weight is selected for the particular type of fishing desired.

It will be also observed that although the casting weight is shown as a circular disc it may have any other suitable configuration, such as oval or pear shape, to meet specific fishing situations.

Having fully described my invention, it is to be understood that I do not wish to be limited to the details herein set forth, but my invention is of the full scope of the appended claims.

I claim:

1. An expendable casting weight for fishing lines, comprising: a weight element having a notched portion; a strip formed at least in part of water soluble material bridging said notched portion to form an eyelet for attaching said weight element to a fishing line, whereby upon submerging said weight element a predetermined time said strip of material frees said weight element.

2. An expendable casting weight as set forth in claim 1, wherein: said weight element is a disc of plastic material impregnated with a weighting substance.

3. An expendable casting weight as set forth in claim 1, wherein: said weight element is a bag containing a weighting material.

4. An expendable casting weight as set forth in claim 1, wherein: said weight element is a disc of plastic material impregnated with a weighting substance and wherein a plurality of notches are provided, each notch being bridged by water soluble material having different solubility periods thereby to provide different time delays between submergence of said weight element and freeing of said weight element.

5. An expendable casting weight as set forth in claim 1, wherein: said weight element is a disc of plastic material impregnated with a weighting substance and wherein a plurality of notches are provided, each bridged by said water soluble material, the bridging portions of said material differing to provide different modes of attachment of said weight element to said fishing line.

6. An expendable casting weight as set forth in claim 1, wherein: a second strip of non-water soluble material also bridges said notch, said non-water soluble material being readily rupturable.

7. An expendable casting weight, comprising: a weight element formed of plastic material and containing a weighting substance, and having a notched portion; a film of water soluble plastic material closing said notch to form an eyelet for attaching said weight element to a fishing line, whereby upon casting said fishing line and weight element and submergence of said weight element in water, said plastic film dissolves.

8. An expendable casting weight as set forth in claim 7, wherein: said weight element is a disc of plastic material and is impregnated with said weighting substance.

9. An expendable casting weight as set forth in claim 7, wherein: said weight element is a bag of plastic material, and said weighting substance is contained therein.

10. An expendable casting weight as set forth in claim 7, wherein: said weight element is a disc of plastic material and is impregnated with said weighting substance; the periphery of said disc is provided with a plurality of notches; and water soluble films having different dissolving times close said notches, whereby the time delay between submergence of said weight and freeing of said line may be preselected.

11. An expendable casting weight as set forth in claim 7, wherein: said film is provided with a rib and is adapted to be penetrated on opposite sides thereof by a fish hook.

12. An expendable casting weight as set forth in claim 7, wherein: said film is provided with a slit and a T-shaped retainer element is provided, said element being attachable to a fishing line and adapted to be inserted through said slit to retain said weight element.

13. An expendable casting weight as set forth in claim 7, wherein: said weight element is a disc of plastic material and is impregnated with said weighting substance; a second film of non-water soluble material also closes said notch, said non-water soluble material being readily rupturable.

References Cited in the file of this patent

UNITED STATES PATENTS

| 1,938,058 | Wiesener | Dec. 5, 1933 |
| 2,308,238 | Baker | Jan. 12, 1943 |
| 2,460,526 | Oliver | Feb. 1, 1949 |

FOREIGN PATENTS

| 579,591 | France | Aug. 6, 1924 |